United States Patent [19]

Housley

[11] Patent Number: 5,449,246
[45] Date of Patent: Sep. 12, 1995

[54] METHOD AND APPARATUS FOR CONSTRUCTING PATTERNED PAVEMENTS

[76] Inventor: Grady E. Housley, 1051 Housley Rd., Marietta, Ga. 30066

[21] Appl. No.: 182,433

[22] Filed: Jan. 18, 1994

[51] Int. Cl.⁶ .............................................. H01C 5/00
[52] U.S. Cl. ................................................... 404/42
[58] Field of Search .............................. 404/18, 27–30, 404/34, 42

[56] References Cited

U.S. PATENT DOCUMENTS 2,760,881 8/1956 Toulmin, Jr. ...................... 404/34 X
5,342,142 8/1994 Barth et al. ......................... 404/42 X

OTHER PUBLICATIONS

"A Drive Of Distinction." Southern Living Magazine 1993, By Jo Kellum. p. 66.

Primary Examiner—Michael P. Buiz
Attorney, Agent, or Firm—Kennedy & Kennedy

[57] ABSTRACT

An apparatus for use in the in situ construction of patterned pavement includes a container (14) and a matrix of capped tubes (15) mounted to the floor of the container. Concrete (17) is distributed within the container and about the tubes and allowed to hardened to form a slab (11) of patterned pavement. The caps are then removed and another material is placed within the tubes to finish the pavement.

17 Claims, 2 Drawing Sheets

METHOD AND APPARATUS FOR CONSTRUCTING PATTERNED PAVEMENTS

TECHNICAL FIELD

This invention relates to apparatuses and methods of constructing patterned pavements in situ.

BACKGROUND OF THE INVENTION

Today there exist a vast number of parking lots, roads, highways and driveways constructed of expanses of solid pavement which prevents water from reaching the ground directly beneath them. This restriction on the ability of the ground to accept water results in an overall decrease in the quantity of groundwater since water is not absorbed. Additionally, since the water upon these surfaces is distributed onto the ground surrounding these concrete areas in addition to the water naturally distributed there, the accumulation is usually too much for the ground to absorb. As a result of this accumulation water erosion and flooding often occurs. Furthermore, government regulations oftentimes dictate that a holding pond must accommodate run off from large parking lot. These holding ponds are potentially dangerous and an inefficient use of the land. In residential areas other government regulations restrict the amount of impermeable surface area allowed upon a given area of land.

Pavements comprised of open-celled, patterned, concrete blocks have been designed which allow water to flow through them to the underlying ground. These blocks are typically formed in brickyards using specially treated molds. Once the blocks are formed they are transported to the construction cite. However, due to the weight of the material used in these blocks they are limited in size. These blocks also require careful handling as they are susceptible to breakage during transportation. The underlying ground also must be made very smooth so that the blocks rest evenly upon it, as blocks placed on uneven ground are susceptible to breakage.

It thus is seen that a need remains for a method and apparatus for constructing patterned pavement in a more effective and efficient manner. It is to the provision of such that the present invention is primarily directed.

SUMMARY OF THE INVENTION

In a preferred form of the invention an apparatus is provided for use in constructing patterned pavements in situ. The apparatus has an open top container and a plurality of tubes mounted uprightly in the open top container in spaced relation with one another. Caps are removably mounted upon the plurality of tubes. Preferably the container and tubes are made of a biodegradable material such as cardboard.

In constructing patterned pavements in situ a number of the open top containers are placed at the site one beside the other with the caps upon the tops of the tubes. A selected paving material is then poured into the containers about and between the tubes. After the paving material cures the caps are removed and another material other than the selected paving material is placed in the tubes.

DETAILED DESCRIPTION

Figure 4:
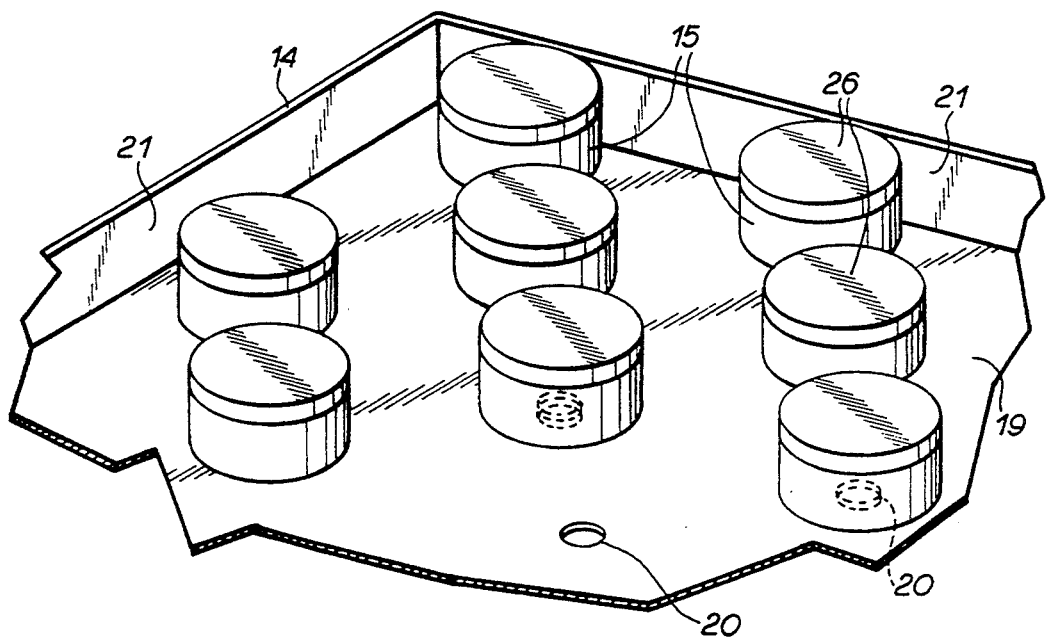
FIG. 4 is a perspective view of a portion of the apparatus in an alternative form of the invention.

With reference next to the drawing, there is shown a portion of a driveway 10 having multiple, abutting slabs 11 of patterned pavement recessed within the ground G. Each slab 11 has an outer container 14, a matrix of tubes 15, and concrete or cement material 17 about and between the tubes 15. The tubes may be of various shapes. For example, in FIG. 4 they are cylindrical while in FIG. 5 they are parallelpiped. The outer container 14 and tubes 15 are preferably made of a lightweight, biodegradable material such as paperboard or cardboard.

Figure 1:
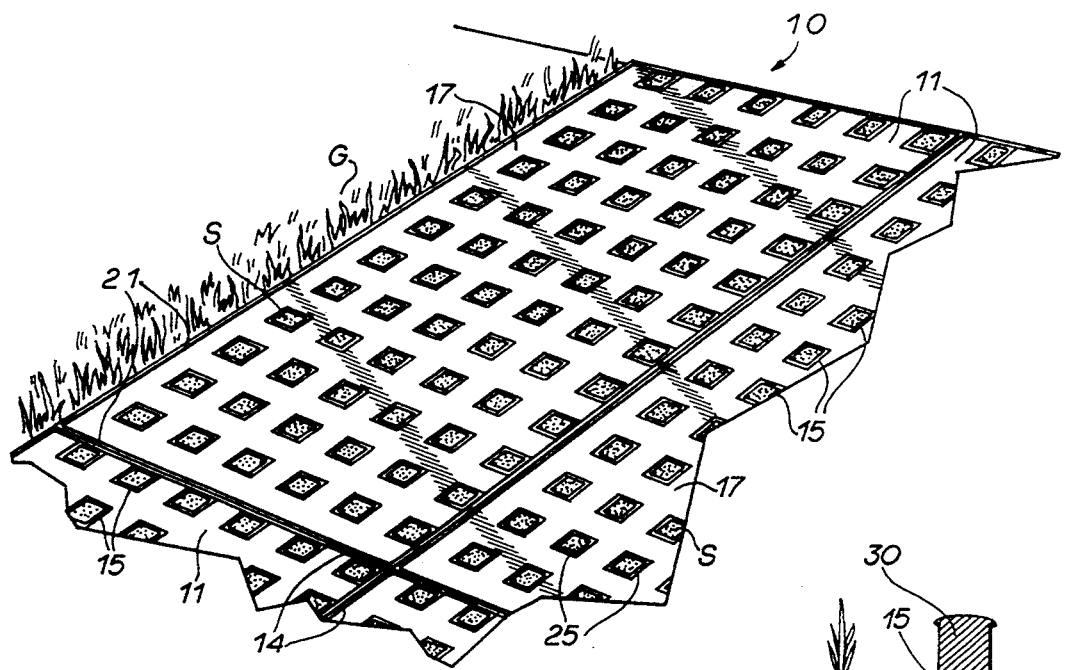
FIG. 1 is a perspective view of a portion of a finished patterned pavement constructed in accordance with principles of the invention in a preferred form.

The container 14 has a floor 19 with a matrix of drain holes 20 therethrough, and side walls 21 extending upwards about the perimeter of the floor 19. Each tube 15 has a bottom wall 23 with a drain hole 24 therethrough and an open top end 25. The bottom wall 23 of each tube is adhered to the container floor 19 with its drain hole 24 aligned with a container drain hole 20. A paperboard cap 26 is adhered to the top end 25 of each tube. As shown in FIG. 1, the tubes 15 are filled with material other than concrete such as soil S.

To construct the slabs 11 of FIG. 1, a shallow hole is dug in the ground that has a size slightly larger than that of the containers 14. Typically, a single container may be 4 by 8 feet or 8 by 8 feet with a height dependant upon the use and load placed upon the resulting pavement. For example, containers used in the construction of residential driveways preferably have approximately a 4 inch height.

Figure 3:
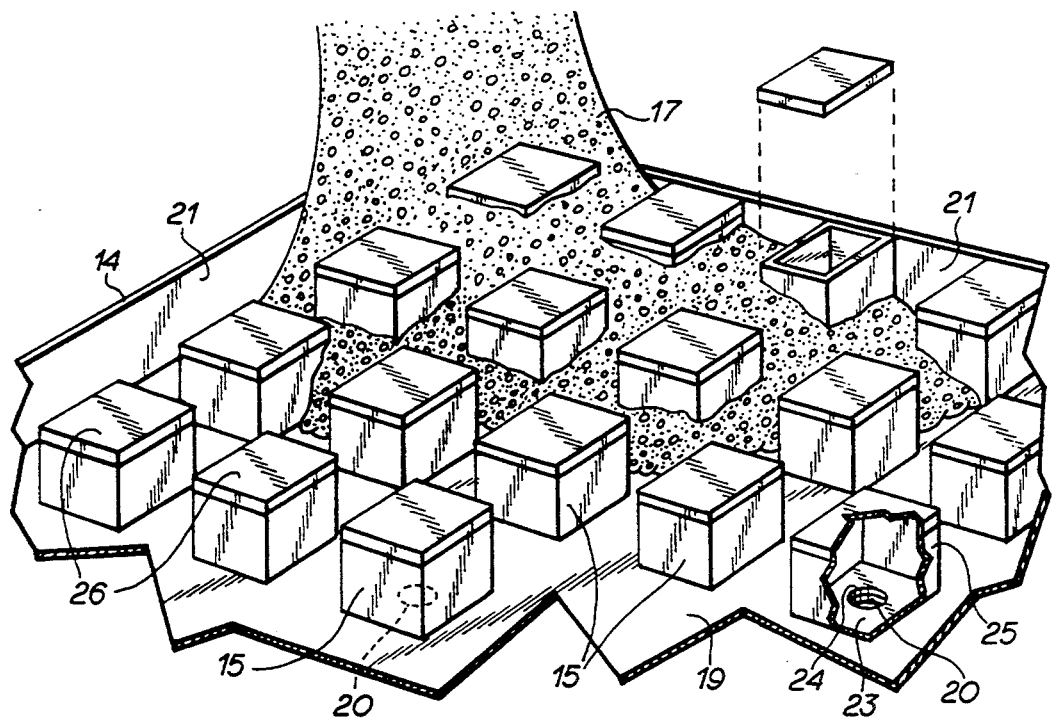
FIG. 3 is a perspective view of a portion of the apparatus for use in forming patterned pavement that embodies principles of the invention in a preferred form and which is shown being filled with concrete.

The floor of the shallow hole is raked level by workers to provide a relatively smooth bottom. The containers are then placed within the hole side-by-side, their number depending, of course, on the width and length of the pavement. As shown in FIG. 3, concrete 17 is next poured into the container 14 and distributed evenly about and between the tubes. The top surface of the concrete 17 is leveled and smoothed to the height of the top surface of the container 14 and caps 26. Once the concrete has cured the cardboard caps are punctured and removed, thus leaving the interior of the tubes 15 exposed.

Figure 5:
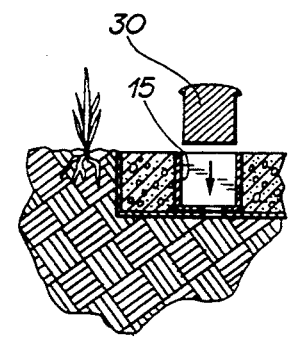
FIG. 5 is a side view, in cross-section, of a portion of patterned pavement shown with a pavement bump being mounted therein.
Figure 2:
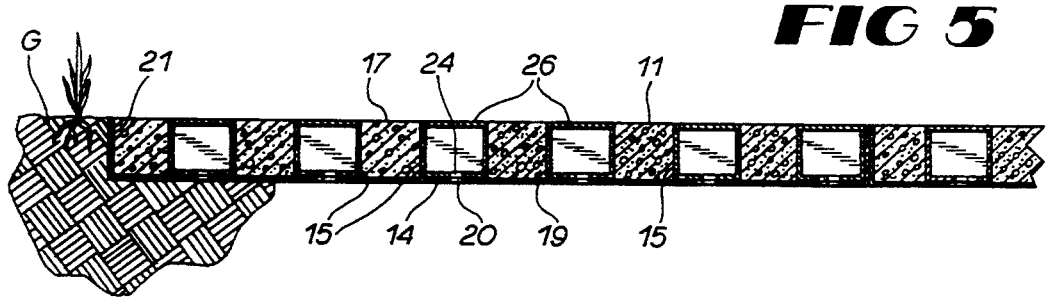
FIG. 2 is a side view, in cross-section, of the portion of patterned pavement of FIG. 1.

Finally, the interior of the tubes 15 are filled with soil S to allow water to pass through the tubes 15, drain holes 20 and 24 and into the underlying ground. Alternatively, sand, gravel, reflector beads or colored concrete may be placed within the tubes. Roadway bumps 30, such as lane divider bumps and attention bumps, also may be removably positioned within the tubes, as shown in FIG. 5. The term attention bumps is meant to describe a line of low rise bumps which extend across a lane in order to alert a driver to an upcoming, potentially hazardous condition such as an intersection.

Again, the container 14 and tubes 15 are preferably made of a biodegradable material such as paperboard. As the container and tubes decompose an expansion joint is created between adjacent slabs 11. Also, with the decomposition of the container and tubes water is more readily allowed to pass unencumbered through the pavement, i.e. without having to be routed through or restricted by the drain holes 20 and 24.

From the foregoing, it is seen that a method and apparatus for the constructing patterned pavement in situ is now provided. It should, however, be understood that the just described embodiments merely illustrate principles of the invention in preferred forms. Many modifications, additions and deletions may, of course, be made thereto without departure from the spirit and scope of the invention as set forth in the following claims.

I claim:

1. Apparatus for use in constructing patterned pavements in situ which comprises, in combination, an open top container, a plurality of tubes mounted uprightly in said open top container in spaced relation with one another, and a plurality of caps removably mounted upon said plurality of tubes.

2. The apparatus of claim 1 wherein said container is biodegradable.

3. The apparatus of claim 2 wherein said container is made of cardboard.

4. The apparatus of claim 2 wherein said container is made of paperboard.

5. The apparatus of claim 2 wherein said tubes are biodegradable.

6. The apparatus of claim 5 wherein said tubes are made of cardboard.

7. The apparatus of claim 5 wherein said tubes are made of cardboard.

8. The apparatus of claim 1 wherein said container has a floor surrounded by upright walls of a selected height.

9. The apparatus of claim 8 wherein said tubes have a length approximately the same as said selected height.

10. A method of constructing a patterned pavement, in situ, which comprises the steps of placing an open top container having a plurality of mutually spaced upright tubes therein at the site; pouring selected paving material into the container about and between the tubes; and placing material other than the selected paving material in the tubes.

11. The method of claim 10 wherein the top ends of the tubes are covered as the paving material is poured and uncovered after the paving material has been poured.

12. The method of claim 10 wherein concrete is poured into the container.

13. The method of claim 10 wherein a material selected from the group consisting of soil, sand, reflective beads, colored concrete and gravel is placed in the tubes.

14. The method of claim 10 wherein roadway bumps are placed in the tubes.

15. The method of claim 10 wherein another container and plurality of tubes of similar construction is placed adjacent the container at the site, the other container also having the paving material poured therein and the other material placed in the tubes.

16. The method of claim 15 wherein biodegradable containers are placed at the site which create expansion joints as the containers decompose.

17. The method of claim 10 wherein biodegradable containers and tubes are placed at the site.

* * * * *